United States Patent

[11] 3,630,009

| [72] | Inventor | Robert Ashton<br>Islington, Ontario, Canada |
|---|---|---|
| [21] | Appl. No. | 872,561 |
| [22] | Filed | Oct. 30, 1969 |
| [45] | Patented | Dec. 28, 1971 |
| [73] | Assignee | Massey-Ferguson Industries Limited<br>Toronto, Ontario, Canada |

[54] SELF-PROPELLED SWEET CORN HARVESTER
10 Claims, 5 Drawing Figs.

[52] U.S. Cl. .................................................. 56/11.9,
56/12.8, 56/14.1, 56/16.6, 198/87, 198/115,
209/137
[51] Int. Cl. ...................................................... A01d 45/02
[50] Field of Search .......................................... 56/15–18,
11.9, 12.8, 14.1, 14.2, 16.6; 214/522; 198/87,
113–115; 209/133–137

[56] References Cited
UNITED STATES PATENTS

| 3,101,579 | 8/1963 | Karlsson et al. | 56/18 |
|---|---|---|---|
| 2,257,097 | 9/1941 | Anderson et al. | 209/136 |
| 555,533 | 3/1896 | Randolph | 209/137 X |
| 2,492,897 | 12/1949 | Siefken | 209/136 X |
| 3,434,271 | 3/1969 | Gaunt et al. | 56/16 |
| 2,834,487 | 5/1958 | Gaddis | 198/115 X |
| 3,521,767 | 7/1970 | Rossi | 198/87 X |

Primary Examiner—Louis G. Mancene
Assistant Examiner—J. A. Oliff
Attorney—Gerhardt, Greenlee & Farris

ABSTRACT: A self-propelled sweet corn harvester with a corn head having multiple snapping units with a pair of snapping rolls and a pair of gathering chains for each snapping unit, a tank for temporary storage of ears of unhusked green corn, a conveyor system to elevate the ears of corn from the corn head to the storage tank, and cleaning means including a fan, an upper beater, a lower beater and hoods for removing stalks and other trash from the ears of corn. The beaters are mounted above the storage tank for both vertical and horizontal adjustment. A conveyor system is provided for removing the cleaned and husked ears of green corn from the tank.

INVENTOR.
ROBERT ASHTON

SELF-PROPELLED SWEET CORN HARVESTER

This invention relates generally to a corn picker. More specifically the invention relates to a self-propelled sweet corn picker for harvesting green sweet corn.

In recent years combine harvester threshers have been adapted to harvest and thresh field corn in one operation by replacing the header unit of standard grain combines with row crop harvesting heads. These row crop harvesting heads have snapping units each of which include a pair of snapping rolls and a pair of gathering chains for each row of corn. Many combines have sufficient capacity to utilize row crop harvesting heads with snapping units for up to eight rows of corn. This development has greatly improved field corn harvesting over prior corn harvesting methods.

Green sweet corn on the other hand is harvested by one and two row corn pickers which are either mounted on a tractor or pulled behind a tractor, With these corn pickers it is necessary to pull a wagon behind the picker to catch the ears of corn conveyed from the picker.

It was discovered that with minor modifications the corn heads used on combines for picking and threshing field corn could pick sweet corn faster, with less loss and with less damage to the ears than the one or two row units mounted on tractors. This increase in the speed of harvesting and decrease in losses is very important to the sweet corn industry in that sweet corn must be harvested and shipped to the cannery within a few hours of the time that it is ready for harvesting. If the moisture content of the corn is not within certain narrow limits when it reaches the cannery it cannot be used for canning purposes.

It would be desirable therefore to have a self propelled sweet corn harvester employing a modified version of the corn heads used on combines and having a storage tank for ears of corn. Unfortunately, a combine is not readily adaptable for harvesting sweet corn. None of the threshing mechanisms of the combine are usable. Also the problems involved with conveying green sweet corn and separating stalks and trash without damaging the ears are considerably different than those encountered with dry field corn.

The sweet corn harvester of this invention includes a frame, drive wheels supporting one end of the frame, at least one steerable wheel supporting the other end of the frame, an operator's platform mounted on the frame, an elevator assembly with its rear end pivotally attached to the frame for pivotal movement about a horizontal axis, a multiple row corn head with snapping units for each row attached to the forward end of the elevator, means to pivot the elevator assembly about said horizontal axis to raise and lower the corn head, a chain and slat-type conveyor for receiving material from the elevator assembly and for conveying the material up and to the rear, a cleaning mechanism for separating trash from the ears of corn which fall from the delivery end of the conveyor including a fan and at least one beater, a tank for temporary storage of the corn which falls from the cleaning mechanisms, and means to unload the storage tank. The features and advantages of the present invention will become apparent to those skilled in the art as the nature of the invention is better understood from the following detailed description particularly when read with reference to the accompanying diagrammatic drawings in which:

Figure 1:
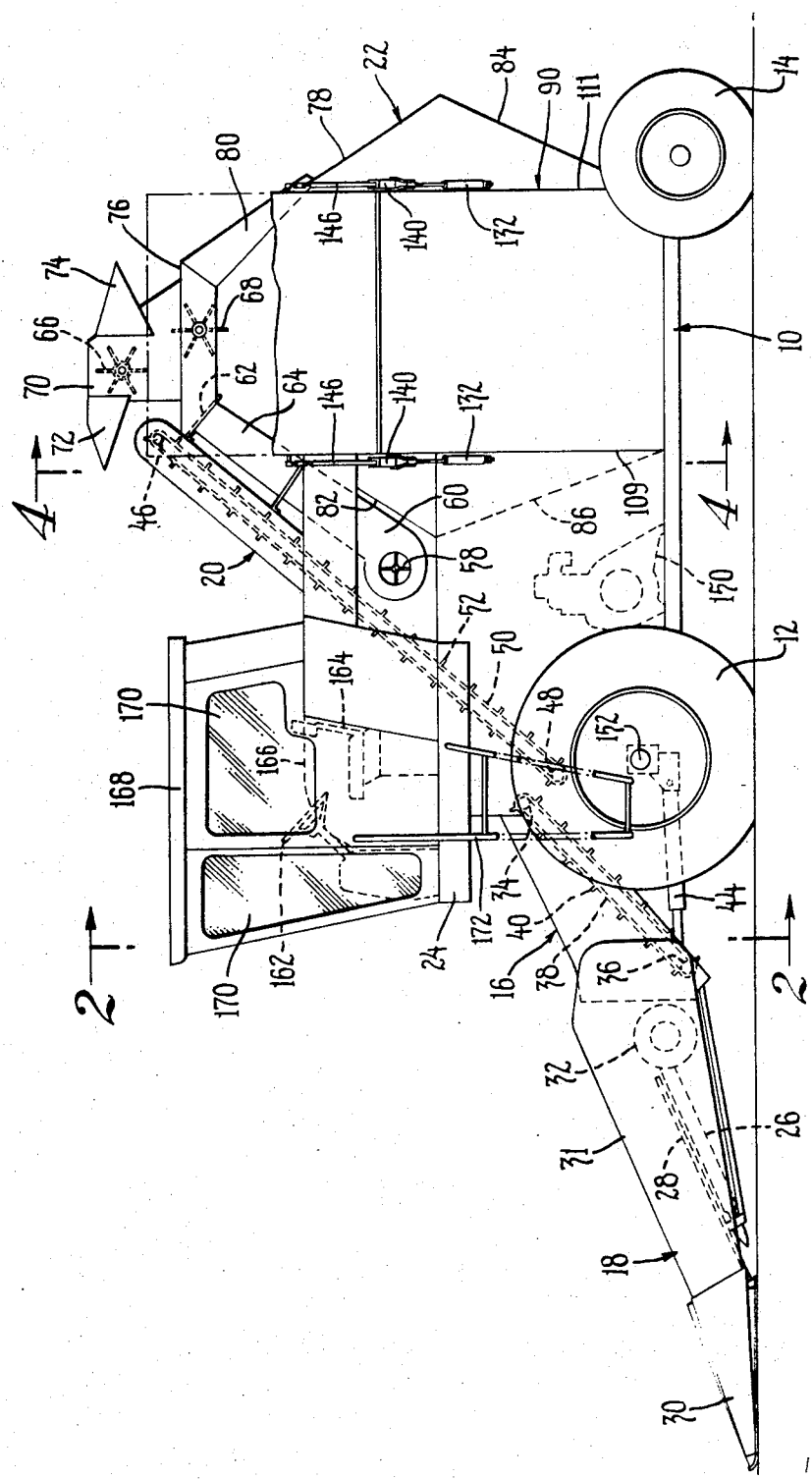
FIG. 1 is a side elevation of a row crop harvester with portions broken away.
Figure 2:
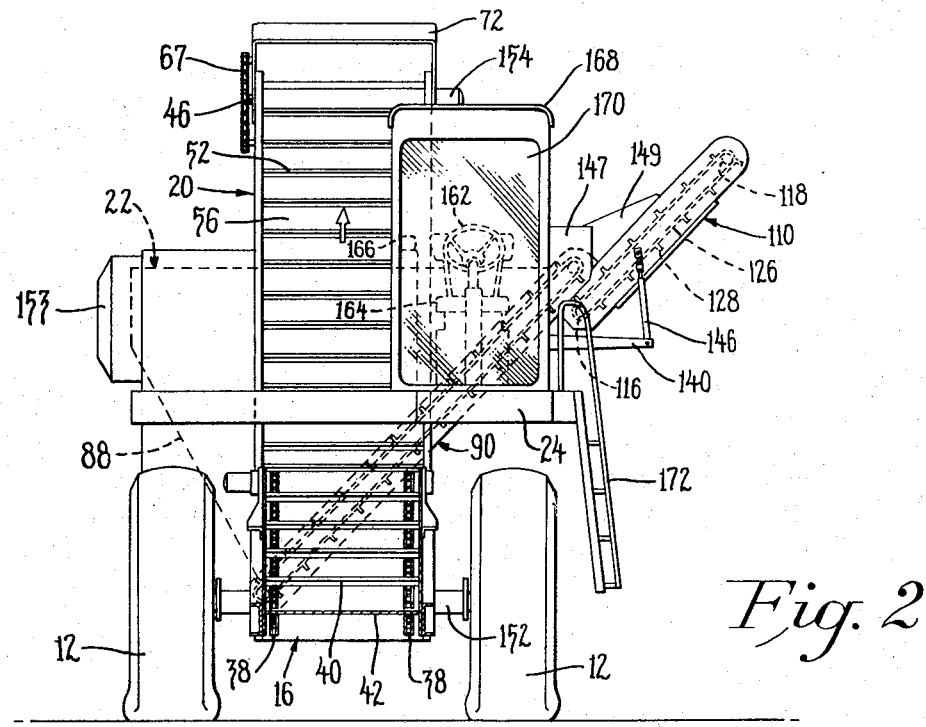
FIG. 2 is a sectional view taken along lines 2—2 of FIG. 1.
Figure 3:
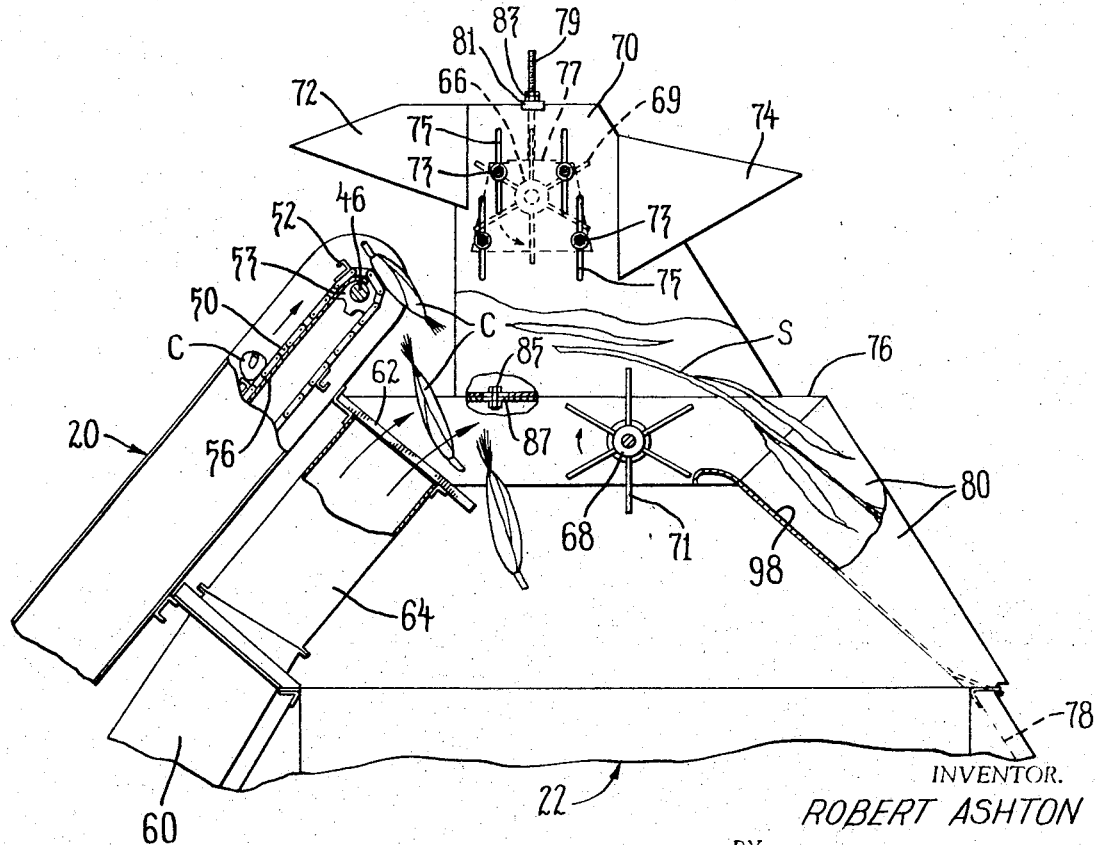
FIG. 3 is an enlarged side elevation of the cleaning mechanism with portions broken away.

The self-propelled sweet corn harvester of this invention as shown in FIG. 1 includes a frame 10, supported on drive wheels 12 and steerable wheels 14. An elevator assembly 16 is pivotally attached to the forward portion of the frame 10. A corn head 18 is attached to the elevator assembly 16. A conveyor assembly 20 is provided to convey ears of corn up and into the storage tank 22. An operator's platform 24 is mounted on the forward portion of the frame 10. Cleaning means are provided to separate stalks and trash from the ears of corn before they are deposited in the storage tank 22.

The corn 18 preferably includes four snapping units, each of which has a pair of snapping rolls 26 and a pair of gathering chains 28. Snout assemblies 30 and dividers 31 are attached to the corn head 18 between each of the snapping units. The snout assembly 30 and dividers 31 guide the rows of corn into each snapping unit. An auger 32 is mounted on the corn head 18 to the rear of the snapping units for rotation about an axis perpendicular to the direction of travel of the machine. The auger 32 conveys the picked ears of corn received from the snapping units toward the center of the machine and into the elevator assembly 16.

The elevator assembly 16 is pivotally mounted on the forward portion of the frame 10 for pivotal movement about the axis of upper shaft 34, a lower shaft 36 is mounted in the lower forward portion of the elevator assembly 16. A pair of chains 38 connected by slats 40 are entrained about sprockets on the shafts 34 and 36. A pan 42 extends from the shaft 34 to the shaft 36 and from one side of the elevator assembly 16 to the other side of the elevator assembly between the upper and lower runs of the chains 38. The upper shaft 34 of the elevator assembly is driven in a clockwise direction as shown in FIG. 1. Thus the slats 40 carry ears of corn received from the auger 32 up the pan 42 of the elevator assembly 16. The elevator assembly 16 is pivoted about the axis of shaft 34 by hydraulic cylinders 44 attached to the front axle 152 and the lower forward portion of the elevator assembly 16 to adjust the height of the corn head 18 above the ground. The slats 40 should be approximately 4 feet long to handle the large quantity of material received from the auger 32 of the corn head 18 if a 4-row corn head is used.

A conveyor assembly 20 receives the ears of corn from the elevator assembly 16 and elevates them up and to the rear. The conveyor assembly 20 includes an upper shaft 46, a lower shaft 48, a pair of chains 50 connected by slats 52 entrained around the sprockets 53 on the upper shaft 46 and sprockets on the lower shaft 48. A plate 56 is provided between the upper and lower runs of the chains 50 to support the material elevated by the slats 52. Conveyor assembly 20 should be approximately the same width as the elevator assembly 16 in order to carry the large volume of material received from the elevator assembly 16. The slats 52 connected to the chains 50 satisfactorily carry the material on the plate 56 from the elevator assembly 16 up and to the rear at an angle of from 45 to 50 degrees above horizontal.

As the ears of corn C fall from the upper end of the conveyor assembly 20 into the storage tank 22 they are subjected to a stream of air. The stream of air is created by fan 58 and the fan housing 60 mounted between the tank 22 and the conveyor assembly 20. The stream of air passes through a grill 62 at the upper end of a duct 64. The stalks and trash mixed with the ears of corn are carried up and to the rear by the stream of air passing from the grill 62. A pair of beaters 66 and 68 are provided to assist the stream of air passing from the grill 62 to carry the stalks and trash up and to the rear of the storage tank 22. The beater 66 is rotatably supported on support members 70. A hood 72 is attached to the support members 70 and extends forward over the delivery end of the conveyor assembly 20. The hood 72 helps guide stalks and other material from the conveyor assembly 20 under the beater 66. A hood member 74 is attached to the support members 70 to the rear of the beater 66. As shown in FIG. 1, the beater 66 rotates counter clockwise and the beater 68 rotates clockwise. The hood 74 helps insure that the beaters 66 and 68 throw stalks and other trash separated from the ears of corn by the stream of air from the grill 62 toward the rear of the machine. Since the ears of green sweet corn are considerably heavier than the stalks and the trash, the stream of air passing through the grate 62 is not sufficient to deflect the ears into the beaters 66 or 68. The ears therefore fall between the grill 62 and the beater 68 and into the storage tank 22. The beaters 66 and 68 employ paddles 69 and 71 which may be either rubber or metal.

Adjustments are provided for the beater 66 which allows it to be moved horizontally or vertically relative to the upper end of the conveyor assembly 20 to provide maximum separation of stalks regardless of crop conditions. Vertical adjustment of the beater 66 is obtained by loosening the bolts 73 and sliding them up and down in the slots 75 in the support members 70. The bolts 73 hold the brackets 77 and the bearings which rotatably support the beater 66, relative to the support members 70 when they are tight. A bolt 79, attached to each of the brackets 77, passes through one of the holes in the bar 81. Nuts 83 are provided on each of the bolts 79 to assist in the vertical adjustment of the beater 66. The beaters 66 and 68 are driven by a chain 67 which is driven by a sprocket on one end of shaft 46.

The support members 70 are mounted on braces 76 which extend between the forward side and the rear side of the storage tank 22. The support member 70 may be moved toward the front of the machine or toward the rear of the machine to adjust the location of the hoods 72 and 74 and the beater 66 horizontally relative to the conveyor assembly 20 and the beater 68. This adjustment is made by loosening the bolts 85 and sliding the bolts in the slots 87 in members 70 and 76. The beater 68 may be made adjustable horizontally or vertically relative to the brace 76 if desired.

The corn stalks and trash which are separated from the ears of corn by the stream of air passing through the grill 62 and by the beaters 66 and 68 slide down the inclined plate 98, attached to the braces 76, and down the upper rear wall 78 of the storage tank 22. The portions 80 of the braces 76 prevent wind from blowing the stalks and trash off the inclined plate 98 and into the storage tank 22.

The storage tank 22 includes an upper rear wall 78 and an upper front wall 82, a lower rear wall 84, a lower front wall 86 and a right side wall 88. The bottom of the storage tank 22 and the biggest portion of the left sidewall is conveyor 90. The conveyor 90 includes a lower shaft 100 and an upper shaft 102. A pair of chains 104 connected by cross slats 106 are entrained around sprockets on the lower shaft 100 and the upper driven shaft 102. A plate 108 is attached to the front side 109 and the rear side 111 of the conveyor 90 and extends from the lower shaft 100 to the upper shaft 102 between the upper and lower runs of the chains 104. In operation the chains 104 which are driven by the upper shaft 102 move the slats 106 which convey ears of corn in the storage tank 22 up the plate 108.

The ears of corn from the conveyor 90 are deposited on a second tank unloading conveyor 110. The second tank unload conveyor 110 has one end pivotally attached to the top of the first unloading conveyor 90 and a second end which is free. The end which is attached to the first conveyor 90 is attached to pivot about pins 112 which pass through the brackets 114 attached to the front and rear sides 109 and 111 of the conveyor 90. The second tank unloading conveyor includes a first shaft 116, and a second shaft 118 journaled in bearings 120 attached to the front side 122 and the rear side 124 of the conveyor. A pair of chains 126 connnected by cross slats 128 are entrained about sprockets on the first and second shafts 116 and 118. A plate 130 is attached to the front and rear sides 122 and 124 of the second tank unloading conveyor 110. The plate 130 is positioned between the upper and lower runs of the chains 126 and extends from the first shaft 116 to the second shaft 118 mounted adjacent to the free end of the conveyor 110. The ears of corn which are deposited on the plate 130 by the first tank unloading conveyor 90 are moved along the plate 130 to the free end of the conveyor by the cross slats 128 and the chains 126. The ears of unhusked corn preferably fall from the free end of the second tank unloading conveyor 110 into a truck or a wagon.

Figure 4:
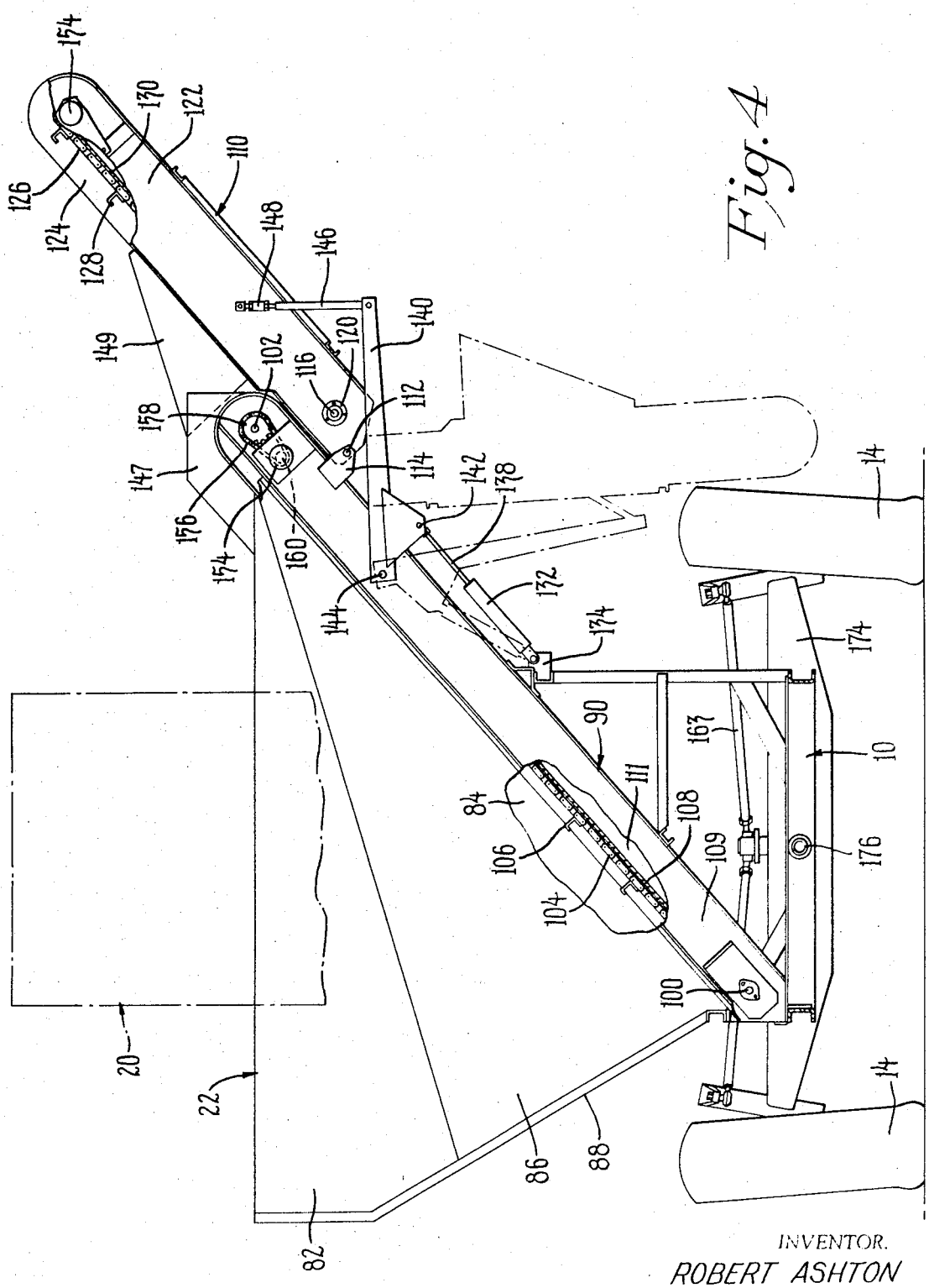
FIG. 4 is an enlarged sectional view of the storage tank with portions broken away taken along lines 4—4 of FIG. 1.

In order to take the ears of corn from the tank 22 and deposit them in a truck or wagon, it is necessary to move the free end of the second tank unloading conveyor 110 up and down in accordance with the height of the truck or wagon which is to receive the ears of corn. The free end of the conveyor 110 is moved up and down by a pair of hydraulic cylinders 132 pivotally attached to the brackets 134 adjacent to the grain tank. These cylinders 132 include pistons 138 which are pivotally attached to the arms 140 by pins 142. The arms 140 are pivotally attached to the sides 109 and 111 of the first grain tank unloading conveyor 90 by pins 144. The free ends of the arms 140 are attached to the second tank unloading conveyor 110 by a pair of connecting rods 146. The connecting rods 146 include length adjustments 148. When the tank is not being unloaded the second tank unloading conveyor 110 can be pivoted about the pins 112 until its free end hangs down toward the ground and does not stick out to the side of the machine where it might hang on an obstruction as shown by the phantom lines in FIG. 4. A shield 147 is attached to each of the sides 109 and 111 of the first tank unloading conveyor adjacent to the upper shaft 102. A shield 149 is attached to each of the sides 122 and 124 of the second tank unloading conveyor 110. The shields 147 and 149 prevent ears of corn from falling off the sides of the conveyors.

The power unit for propelling the machine and driving the various assemblies includes a liquid cooled internal combustion engine 150 mounted on the frame 10 to the rear of the front axle 152 and below the fan 58. The air for cooling the engine is filtered by a screen 153. Power is transmitted from the engine to the drive wheels 12 by power transmission means some of which are not illustrated. It has been found advantageous to drive the elevator assembly 16, the conveyor 20 and the first and second tank unloading conveyors 90 and 110 by hydraulic motors 154. The hydraulic motors 154 are driven by a pump which is driven by the engine 150. The hydraulic motors 154 provide a cushioning effect which prevents damage to the chains and cross slats when ears of corn catch on various parts of the machine. The hydraulic motor 154 for driving the first tank unloading conveyor transmits torque to the upper driven shaft 102 through chain 156 and sprockets 158 and 160. The other hydraulic motors 154 are attached directly to the driven shafts 34, 46 and 118.

The operator's platform 24 as shown in FIG. 1 includes a steering wheel 162, a seat 164 and a control console 166. A cab 168 with windows 170 may be provided to protect the operator if desired. A ladder 172 is attached to the operator's platform 24 to assist the operator in entering the cab 168. The rear wheels 14 are operatively connected to the steering wheel 162 by hydrostatic means and a tie rod assembly 163. The rear wheels 14 are mounted on a long axle 174 that is pivotally attached to a horizontal pin 176 in the center of the frame 10 and toward the rear of the machine. The wheels 14 are spaced from the frame 10 a distance sufficient to allow the wheels 14 to be turned sharply without contacting the frame. It is desirable that the machine be able to make a 180 degree turn in a short distance. Wheel brakes are normally provided on the wheels 12 to assist the machine operator in making short turns.

In operation the machine is propelled to the field by the drive wheels 12. A row of corn enters each snapping unit of the corn head where the ears are snapped by the snapping rolls 26 and are conveyed by the gathering chains 28 to the auger 32. The auger 32 gathers the ears of corn from all the snapping units and conveys them to the elevator assembly 16. The elevator assembly 16 includes a pair of chains 38 with slats 40. The slats carry the ears of corn up the plate 42 and drops then onto a conveyor assembly 20. The conveyor assembly 20 has slats 52 which carry the ears of corn from the elevator assembly 16 up and to the rear. As the ears of corn drop off of the upper end of the conveyor assembly 20 they fall into a stream of air passing through the grill 62. This stream of air blows the corn stalks and other trash mixed with ears of corn up and to the rear.

Figure 5:
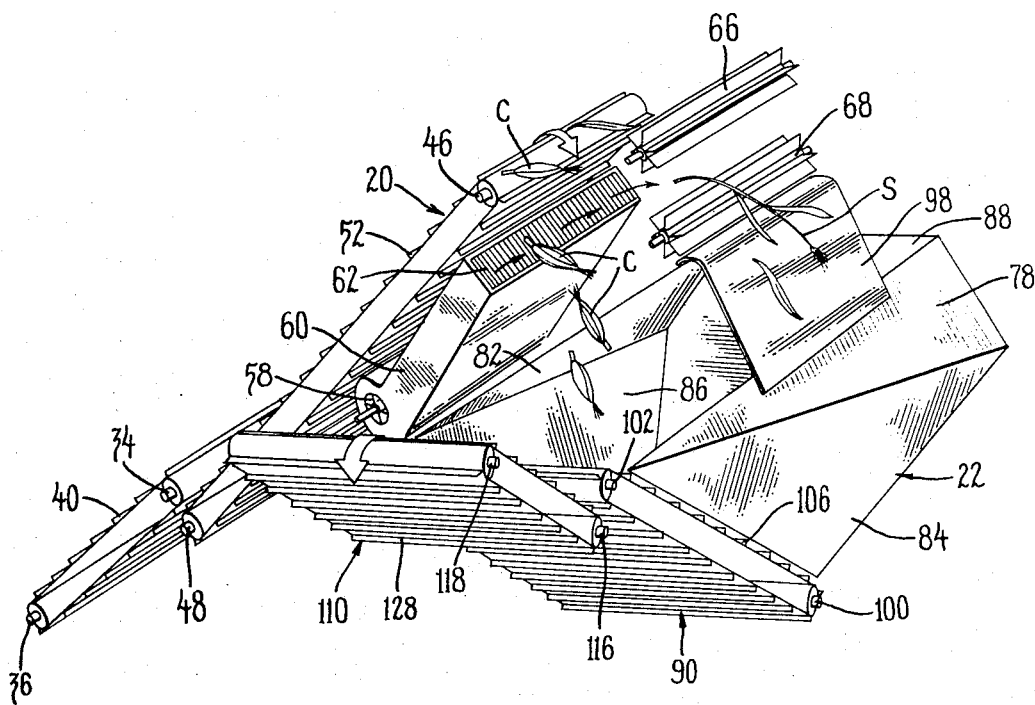
FIG. 5 is an enlarged fragmentary schematic perspective view showing some of the conveyors, the cleaning apparatus and the storage tank.

With the assistance of the hood 72, the beater 66, the beater 68 and the hood 74 the stalks and other trash separated from the ears of corn C by the stream of air are deposited on top of the upper rear wall section 78 of the tank 22 as shown in FIG. 5. The stalks and other material slide down the wall section 78 and drop to the ground behind the machine. The ears of corn, which are heavier than the stalks and the other material separated by the air from the grill 62, fall into the storage tank 22. When the tank 22 is filled the second tank unloading conveyor is raised so that the outer free end is above the sides of a receptacle which is to receive the ears of corn. The receptacle is moved to a position beside the tank. The slats 106 of the lower tank unloading conveyor 90 carry the ears of corn up the plate 108 and drop them on one end of the second tank unloading conveyor 110. The second tank unloading conveyor 111 then conveys the ears of corn to the left side of the machine and drops them into a receptacle such as a wagon. This wagon then carries the ears of corn to a cannery for further processing and canning.

I claim:

1. A self-propelled corn harvester including a frame, drive wheels supporting one end of the frame, at least one steerable wheel supporting the other end of the frame, an operator's platform mounted on the frame, an elevator assembly with its rear end pivotally attached to the frame for pivotal movement about a horizontal axis, a multiple row corn head with a snapping unit for each row of corn attached to the forward end of the elevator assembly, each snapping unit of said multiple row corn head including a pair of snapping rolls and gathering chains, means to pivot said elevator assembly about said horizontal axis to raise and lower said multiple row corn head relative to the ground, conveyor means for receiving material from the elevator assembly and for conveying the material up and to the rear, cleaning means for separating trash from the ears of corn which fall from the delivery end of said conveyor means, said cleaning means including fan means and at least one substantially horizontally extending beater, spaced horizontally to the rear of the delivery end of the conveyor means, drive means to drive said beater to eject corn stalks from the machine and to assist in ejecting light trash separated from the ears of corn by air from the fan means, a tank for temporary storage of the ears of corn which fall from the conveyor means into the tank, and means to unload the storage tank.

2. The self-propelled corn harvester of claim 1 wherein the fan means includes a fan housing, a duct assembly for directing a stream of air from the fan toward the ears of corn falling from the conveyor means to separate the stalks and leaves from the ears of unhusked corn, and a grill to prevent ears of corn from entering the duct assembly.

3. The self-propelled corn harvester of claim 2 wherein the cleaning means includes an upper horizontally extending beater, a lower horizontally extending beater, and means to drive both beaters to assist in removing material from the machine which is separated from the ears of corn by the stream of air from the fan.

4. The self-propelled corn harvester of claim 1 wherein the cleaning means includes a hood for directing material separated from the ears of corn toward the beater.

5. The self-propelled corn harvester of claim 4 wherein the cleaning means includes a hood for directing material separated from the ears of corn away from the beater.

6. The self-propelled corn harvester of claim 3 wherein the upper horizontally extending beater is adjustable up and down and toward the front or the rear relative to the conveyor assembly.

7. The self propelled corn harvester of claim 3 wherein a first hood is mounted in front of the upper horizontally extending beater, a second hood is mounted to the rear of the upper horizontally extending beater, and adjustment means are provided to adjust the upper beater and both hoods as a single unit toward or away from the conveyor assembly.

8. The self-propelled corn harvester of claim 1 wherein the means to unload the storage tank includes a first continuous conveyor mounted in the storage tank and a second continuous conveyor with one end pivotally attached to the machine adjacent to the delivery end of the first storage tank unloading conveyor.

9. The self-propelled corn harvester of claim 8 including power means to pivot the second storage tank unloading conveyor about the pivotal connection to the machine to raise and lower the delivery end of the second storage tank unloading conveyor.

10. The self-propelled corn harvester of claim 1 wherein the elevator assembly, the conveyor means for receiving material from the elevator assembly and the means to unload the storage tank are driven by hydraulic motors.

* * * * *